L. BALL.
PULLING ATTACHMENT FOR MOTOR DRIVEN VEHICLES.
APPLICATION FILED JULY 3, 1918.
1,308,615.
Patented July 1, 1919.
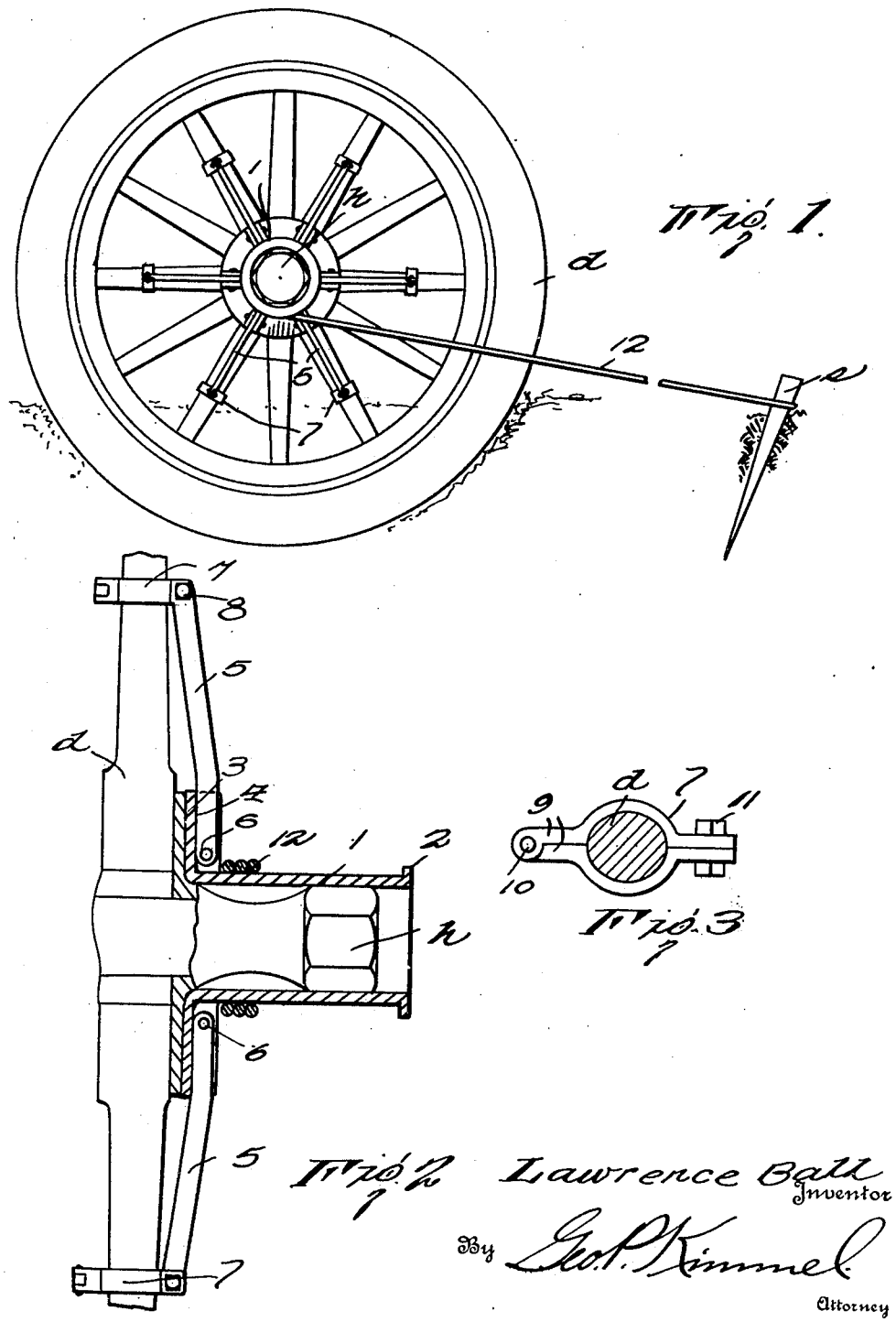
Lawrence Ball
Inventor
By Geo. P. Kimmel
Attorney

LAWRENCE BALL, OF BRAZIL, INDIANA.

PULLING ATTACHMENT FOR MOTOR-DRIVEN VEHICLES.

1,308,615.   Specification of Letters Patent.   Patented July 1, 1919.

Application filed July 3, 1918. Serial No. 243,149.

*To all whom it may concern:*

Be it known that I, LAWRENCE BALL, a citizen of the United States, and resident of Brazil, in the county of Clay and State of Indiana, have invented certain new and useful Improvements in Pulling Attachments for Motor-Driven Vehicles, of which the following is a specification.

This invention relates to improvements in emergency attachments or devices for motor driven vehicles and especially to those devices for pulling motor driven vehicles from mud, sand or like matter such as may be encountered on roads and which, due to the loss of the tractive efforts of the driving wheels thereon will cause the stalling of a vehicle engaged therewith, and it is the principal object of the invention to provide a novel form of windlass or drum which can be attached to the driving wheels of a motor driven vehicle in a manner to cause the coiling or winding of a cable thereabout upon rotation of said driving wheels, the remaining end or ends of the cables, of course, being secured to a fixed object arranged at a point on the road beyond the position in which the vehicle is stalled, hence, permitting said vehicle to be hauled or moved from the mud, sand or other matter onto the solid surface of the road.

Another and equally important object of the invention is to provide a device of the character mentioned which when not in use can be folded into compact form and placed in the toolbox or kit of a vehicle or other confined or limited space, thus rendering the same convenient for use by tourists and like parties.

Other objects will be in part obvious and in part pointed out hereinafter.

The improvements in the details and arrangement of parts will be apparent from an inspection of the accompanying drawings when considered in connection with the specific description hereinafter contained and wherein a preferred embodiment of the invention is disclosed for the purpose of imparting a full understanding thereof.

In the drawings:

Figure 1 is a side elevation of the device attached to the driving wheel of a motor driven vehicle, Fig. 2 is a vertical section therethrough, and Fig. 3 is a detail in section through one of the spokes of the driving wheel showing the connection of the clamp therewith.

Referring now more specifically to the drawings, in connection with which like reference characters will designate corresponding parts throughout the several views, $d$ represents one of the driving wheels of a motor driven vehicle to which my improved self-pulling attachment is applied. In this connection, it is of course to be understood that a pair of these devices are employed, one being arranged or connected to each of the several driving wheels of the vehicle. However, since the construction of each is identical, reference will be hereinafter had to but one of the same and to but one of the driving wheels, it of course being understood that such description will suffice for each device.

The improved self-pulling device or attachment includes a cylindrical tubular drum 1 having its outer end flanged as at 2 while its inner end is provided with a wider flange 3 adapted to be engaged with the adjacent portion of the hub plate of the hub 8 of the driving wheel $d;$ the hub 8, obviously, being snugly received by the tubular drum, as clearly shown in the Fig. 2. A plurality of pairs of radially disposed ribs generally indicated by the numeral 4 are formed integral with the outer face of the flange 3 and are apertured to receive pivot pins, hereinafter mentioned, therethrough.

Arms indicated by the numeral 5 are pivoted at certain of their ends between the spaced pairs of ribs 4, pivot pins 6 passing through said ends of the arms and through the apertures formed in the various pairs of ribs 4, while clamps 7 are pivotally engaged with the outer ends of the arms 5 as at 8 and are adapted to have the several arms thereof engaged about portions of the spokes of the driving wheel $d$, thus effecting positive connection between the driving wheel and the device, whereby to cause rotation of the drum 1 upon rotation of said drive wheel.

In this connection, it may be noted that the clamps 7 comprise arms 9 pivotally connected at certain of their ends as at 10, having the intermediate portions thereof offset for arrangement about the spokes of the driving wheel while the opposite ends of the same are apertured to permit the passage of connecting bolts 11 therethrough for an obvious purpose.

A cable 12 is engaged at one end with the drum 1 and, as will be understood, is adapted to be coiled thereabout while the remaining end of the same, when in use, is adapted to be engaged with a stake $s$ or other fixed object arranged on the roadway at a point beyond or distant from the position in which the vehicle is stalled.

From the foregoing, it is believed that a full understanding of the construction and operation of the device when attached to the driving wheel $d$ of a motor driven vehicle will be gained. However, attention is particularly directed to the fact that when the device is not in use, the arms 5 thereof can be folded to positions whereat they are substantially parallel with the sides of the drum 1, hence, rendering the same compact and allowing it to be placed in the tool box, kit or other out-of-the-way place or compartment on a motor driven vehicle. When the arms are arranged in positions to be engaged with the spokes of the driving wheel $d$, portions of the same will be arranged between the spaced pairs of ribs 4 and in this way will be braced with relation to the engaging flange 3 of the device, thus preventing the imparting of abnormal strain or stress to the pivot pins 6 and rendering the same strong and durable when in use. Due to the pivoting of the clamps 7 to the outer ends of the arms 5, said clamps can be moved to positions with relation to the arms such as will require the smallest possible space. Further, the clamps can be effectually adjusted in positions with relation to the spokes of the driving wheel such as to insure proper functioning of the same.

Manifestly, the construction shown is capable of considerable modification and such modification as is within the scope of my claim I consider within the spirit of my invention.

I claim:

A device of the character described, comprising a tubiform drum adapted to fit the hub of a wheel and having annular flanges at opposite ends, one of the flanges being of a considerably greater width than the other flange, spaced parallel ears formed on the wider flange, and extending radially from the drum the full width of said flange, a plurality of arms having their inner ends arranged between the ears, pivots swingingly connecting the inner ends of the arms to said ears, and spoke clamps at the outer ends of the arms adapted for detachable engagement with the spokes of the wheel when the drum is mounted upon its hub.

In testimony whereof, I affix my signature hereto.

LAWRENCE BALL.

Copies of this patent may be obtained for five cents each, by addressing the "Commissioner of Patents, Washington, D. C."